United States Patent
Yuki et al.

(10) Patent No.: US 10,817,821 B2
(45) Date of Patent: Oct. 27, 2020

(54) WORKFLOW CONTROL DEVICE AND NON-TRANSITORY COMPUTER-READABLE STORAGE MEDIUM HAVING STORED THEREIN WORKFLOW CONTROL PROGRAM FOR CONTROLLING WORKFLOW REGARDING OPERATION ON ELECTRONIC APPARATUS

(71) Applicant: KYOCERA Document Solutions Inc., Osaka-shi, Osaka (JP)

(72) Inventors: Akira Yuki, Osaka (JP); Wataru Endo, Osaka (JP); Yuri Moritani, Osaka (JP); Ryosuke Ogishi, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 1174 days.

(21) Appl. No.: 14/862,031

(22) Filed: Sep. 22, 2015

(65) Prior Publication Data
US 2016/0092806 A1    Mar. 31, 2016

(30) Foreign Application Priority Data
Sep. 26, 2014    (JP) ................... 2014-197152

(51) Int. Cl.
   *G06Q 10/06*     (2012.01)
   *G06F 11/07*     (2006.01)
   *G06F 3/12*     (2006.01)

(52) U.S. Cl.
   CPC ....... *G06Q 10/0633* (2013.01); *G06F 3/1275* (2013.01); *G06F 11/07* (2013.01)

(58) Field of Classification Search
CPC .. G06F 3/1275; G06F 3/1204; G06F 11/0793; G06F 3/1253; G06F 11/3438;
(Continued)

(56) References Cited

U.S. PATENT DOCUMENTS 5,018,082 A * 5/1991 Obata ................ G06F 9/453
                                              715/707
7,210,073 B1 * 4/2007 Landwehr ............ G06Q 10/06
                                           714/47.2
(Continued)

FOREIGN PATENT DOCUMENTS

| JP | 2005258672 A | 9/2005 |
|---|---|---|
| JP | 2008217685 A | 9/2008 |
| JP | 2013037463 A | 2/2013 |

*Primary Examiner* — Johnna R Loftis
(74) *Attorney, Agent, or Firm* — Alleman Hall Creasman & Tuttle LLP

(57) ABSTRACT

A workflow control device includes a workflow management processing portion, a clumsiness detection processing portion, and a display processing portion. The workflow management processing portion manages a workflow for combining processes corresponding to specific operations on an electronic apparatus, in a specific order and performing execution instructions for the processes. The clumsiness detection processing portion detects clumsiness in an operation which has been performed by a user on the electronic apparatus and delayed from a threshold. The display processing portion causes an order of processes based on a workflow through which execution instructions for processes corresponding to operations of the user can be performed in order, to be displayed on a screen based on detection of the clumsiness.

5 Claims, 3 Drawing Sheets

(58) Field of Classification Search
CPC ............... G06F 9/453; G06Q 10/0633; H04N 2201/0094; H04N 1/00408
USPC ...................................................... 705/7.27
See application file for complete search history.

(56) References Cited

U.S. PATENT DOCUMENTS

| | | | | |
|---|---|---|---|---|
| 7,533,339 | B2* | 5/2009 | Wadhwa | G06F 9/453 715/705 |
| 7,743,340 | B2* | 6/2010 | Horvitz | G05B 19/404 715/808 |
| 8,196,042 | B2* | 6/2012 | Hinckley | G06F 9/453 715/711 |
| 2006/0136280 | A1* | 6/2006 | Cho | G06Q 10/06 705/7.13 |
| 2006/0136488 | A1* | 6/2006 | Mifune | H04N 1/00204 |
| 2006/0179058 | A1* | 8/2006 | Bram | G06F 21/121 |
| 2007/0016557 | A1* | 1/2007 | Moore | G06Q 10/10 |
| 2007/0027733 | A1* | 2/2007 | Bolle | G06F 19/321 705/7.13 |
| 2008/0177612 | A1* | 7/2008 | Starink | G06Q 10/06 705/7.26 |
| 2008/0222213 | A1 | 9/2008 | Arai | |
| 2009/0019271 | A1* | 1/2009 | Kawakami | G06Q 10/06 712/227 |
| 2009/0276266 | A1* | 11/2009 | Nishiyama | G06Q 10/10 705/7.27 |
| 2010/0223557 | A1* | 9/2010 | Kenney | G06Q 10/10 715/736 |
| 2013/0016910 | A1* | 1/2013 | Murata | H04N 21/8583 382/195 |
| 2013/0226639 | A1* | 8/2013 | Yokoyama | G06Q 10/06 705/7.14 |
| 2014/0288997 | A1* | 9/2014 | Schultz | G06Q 10/0635 705/7.28 |
| 2015/0121219 | A1* | 4/2015 | Baklanovs | G06F 9/453 715/712 |

* cited by examiner

WORKFLOW CONTROL DEVICE AND NON-TRANSITORY COMPUTER-READABLE STORAGE MEDIUM HAVING STORED THEREIN WORKFLOW CONTROL PROGRAM FOR CONTROLLING WORKFLOW REGARDING OPERATION ON ELECTRONIC APPARATUS

INCORPORATION BY REFERENCE

This application is based upon and claims the benefit of priority from the corresponding Japanese Patent Application No. 2014-197152 filed on Sep. 26, 2014, the entire contents of which are incorporated herein by reference.

BACKGROUND

The present disclosure relates to a workflow control device and a non-transitory computer-readable storage medium having a workflow control program stored therein, which control a workflow for combining processes corresponding to operations on an electronic apparatus such as an image forming apparatus and performing execution instructions for the processes.

As an example of a typical electronic apparatus, an image forming apparatus having a plurality of functions such as a facsimile function and a function as a document server in addition to a print function, such as a digital multifunction peripheral, is known.

When a user uses such a plurality of functions, the user may be required to perform processes based on a specific function based on a specific order. For example, in an image forming apparatus installed in an organization such as a company, causing specific processes, such as scanning, storing, circulating, approving, and distributing of a document, to be sequentially performed when a user (e.g., an employee, etc.) in the organization uses the image forming apparatus may be established as a rule.

In this case, the user needs to perform specific operations for performing execution instructions for scanning, storing, circulating, approving, and distributing of a document, etc. in a specific order according to the established rule.

In a typical technique, a workflow in which execution instructions for processes corresponding to specific operations are combined in a specific order is registered beforehand. In this typical technique, when a user selects the registered workflow, the execution instructions for the processes corresponding to the specific operations are performed in the specific order with respect to the image forming apparatus.

In the above typical technique, if a user (registrant) who has registered a workflow and a user (executor) who makes a selection are different from each other, the executor performs unique setting.

In addition, in the typical technique, among a large number of registered workflows, personal workflows of a user who is about to select a workflow and workflows that are important for an organization such as a company to which the user belongs are displayed so as to be viewable at one time.

SUMMARY

A workflow control device according to an aspect of the present disclosure includes a workflow management processing portion, a clumsiness detection processing portion, and a display processing portion. The workflow management processing portion is that performs a process of managing a workflow for combining processes corresponding to specific operations on an electronic apparatus, in a specific order, and performing execution instructions for the processes. The clumsiness detection processing portion is that performs a process of detecting clumsiness in an operation which has been performed by a user on the electronic apparatus and delayed from a threshold. The display processing portion is that performs a process of causing an order of processes based on a workflow through which execution instructions for processes corresponding to operations of the user can be performed in order, to be displayed on a screen based on detection of the clumsiness.

A storage medium according to an aspect of the present disclosure is a non-transitory computer-readable storage medium having stored therein a workflow control program executable by a computer. The workflow control program causes the computer to realize a workflow management function, a clumsiness detection function, and a display function. The workflow management function is a function of performing a process of managing a workflow for combining processes corresponding to specific operations on an electronic apparatus, in a specific order and performing execution instructions for the processes. The clumsiness detection function is a function of performing a process of detecting clumsiness in an operation which has been performed by a user on the electronic apparatus and delayed from a threshold. The display function is a function of performing a process of causing an order of processes based on a workflow through which execution instructions for processes corresponding to operations of the user can be performed in order, to be displayed on a screen based on detection of the clumsiness.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

An object of allowing even a user who does not recognize a workflow beforehand to perform an execution instruction for a process following the workflow is achieved by displaying an order of processes in a workflow which includes, in order, processes corresponding to operations already performed by the user, on a screen based on detection of clumsiness in an operation performed by the user on an electronic apparatus

[Configuration of Image Forming Apparatus]

Figure 1:
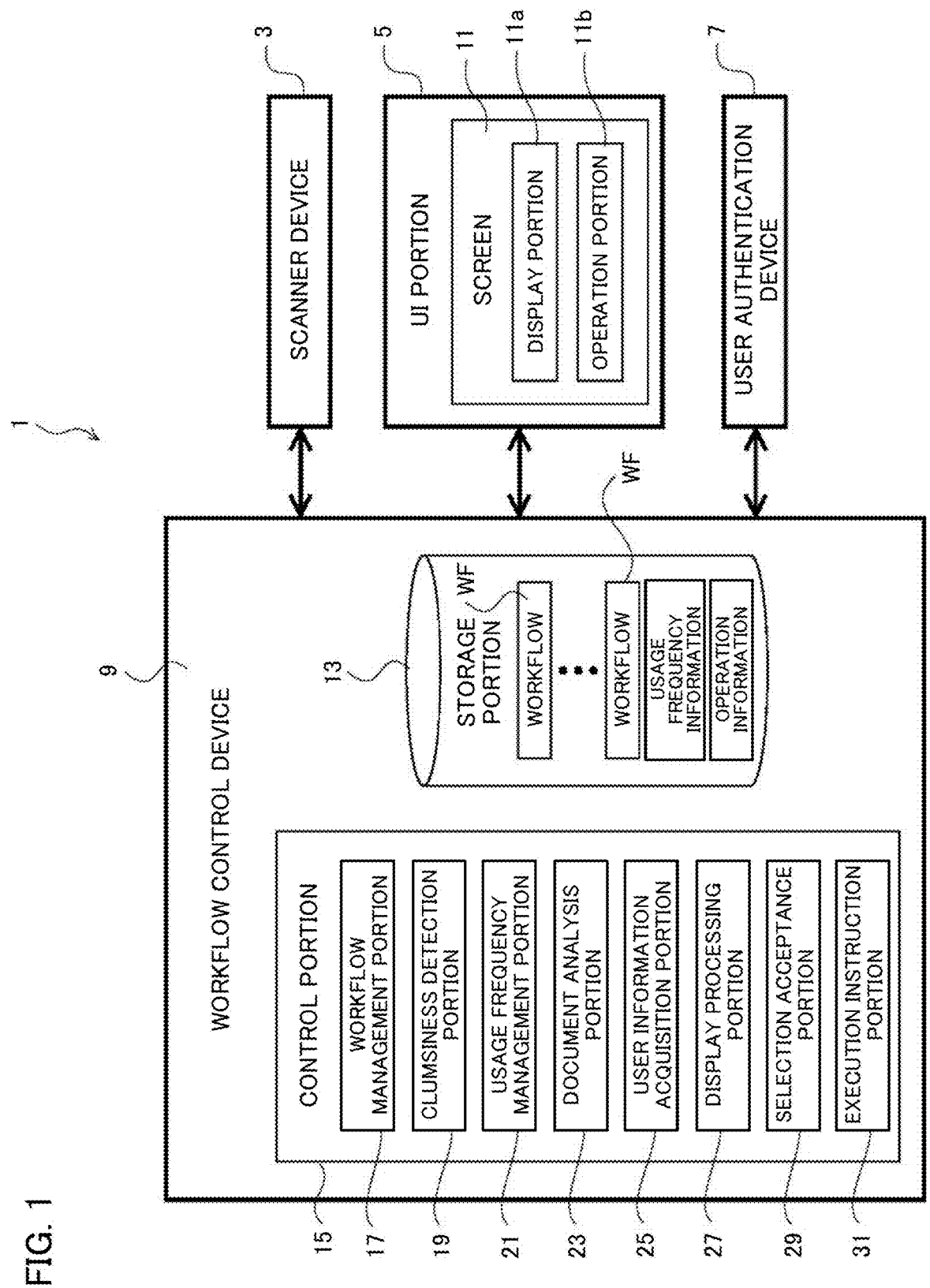
FIG. 1 shows a main part of an image forming apparatus including a workflow control device according to an example of an embodiment of the present disclosure.

FIG. 1 shows a main part of an image forming apparatus including a workflow control device according to an example of an embodiment of the present disclosure.

The image forming apparatus 1 is installed in an organization such as a company, and is used by a user in the organization, such as an employee. The image forming apparatus 1 is a digital multifunction peripheral or the like as an electronic apparatus, and has a plurality of functions such as a print function, a copy function, a scanner function, a facsimile function, and a document server function. These functions of the image forming apparatus 1 can be realized by components included in a well-known image forming apparatus, and thus the detailed description thereof is omitted.

The image forming apparatus 1 in FIG. 1 includes a scanner device 3, a user interface portion (hereinafter, referred to as "UI portion") 5, a user authentication device 7, a workflow control device 9, and the like.

The scanner device 3 includes a control circuit, a scanning mechanism, and the like, reads a document image, and generates scanned image data corresponding to the document image.

The UI portion 5 includes a screen 11 such as a touch panel type liquid crystal, and a control circuit. The UI portion 5 enables, on the screen 11, inputting of an operation performed on the image forming apparatus 1 and displaying of a state of the operation. The UI portion 5 of the present embodiment includes a display portion 11a and an operation portion 11b on the screen 11 in a workflow control process described later. The control circuit of the UI portion 5 can be realized by an arithmetic processing unit such as a dedicated processor or a central arithmetic processing unit such as a CPU (Central Processing Unit).

Figure 2:
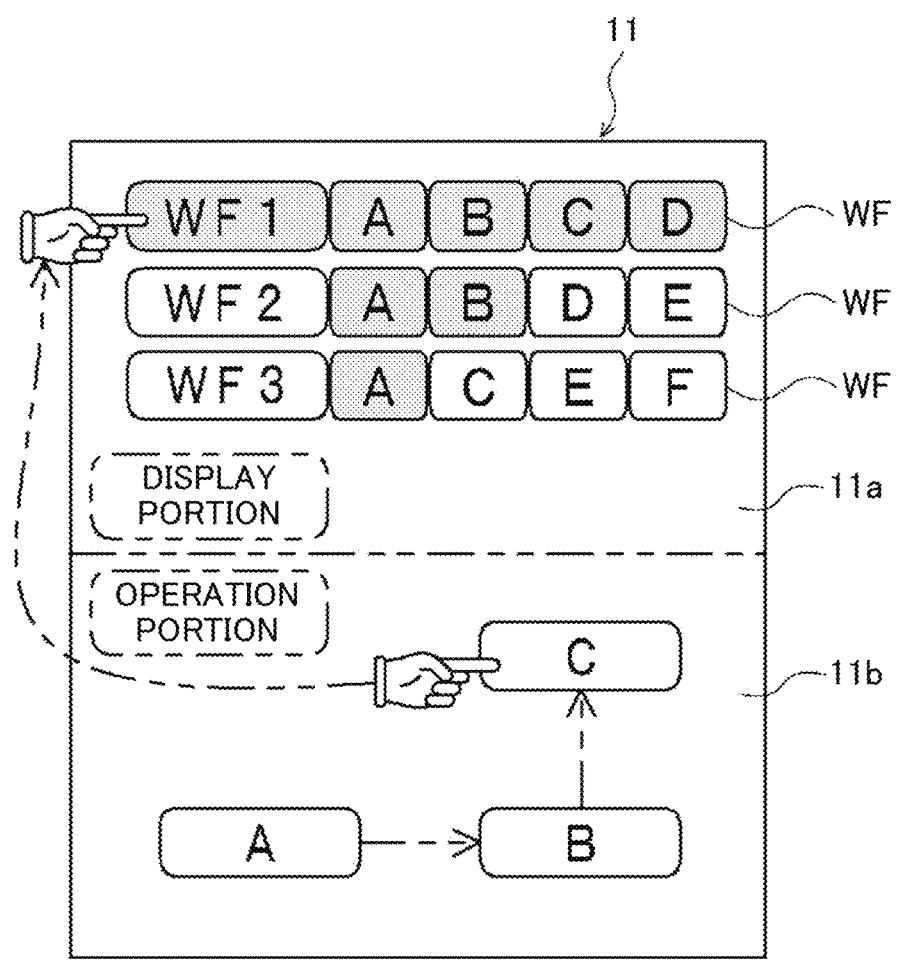
FIG. 2 shows a display portion and an operation portion on a screen of a UI portion provided in the image forming apparatus in FIG. 1.

FIG. 2 shows the display portion 11a and the operation portion 11b on the screen 11 of the UI portion 5.

The display portion 11a is partitioned as a display area for workflows WF on the screen 11 of the UI portion 5, and displays the workflows WF such that each workflow WF is selectable by a touch operation of the user. FIG. 2 illustrates a case where workflows WF1 to WF3 are displayed in the display portion 11a.

Each workflow WF is a data block including instruction information for combining and executing processes corresponding to specific operations on the image forming apparatus 1, in a specific order. For example, the workflow WF is a program, a library, or another data structure. Therefore, when the workflow WF is selected by a touch operation of the user on the display portion 11a, execution instructions for the processes are performed with respect to each portion of the image forming apparatus 1 in the combined order. Use of the workflow WF is not limited to use in the workflow control process, and it is also possible to search for the workflow WF in the UI portion 5 and use the workflow WF.

Examples of the processes for which the execution instructions are performed through the workflow WF include processes based on the functions of the image forming apparatus 1 such as scanning, storing, circulating, approving, distributing, printing, sending via e-mail, sending via facsimile, of a document.

As the displaying of the workflows WF, identification information (WF1 to WF3 in FIG. 2) of each workflow WF as well as an order of processes (A to F in FIG. 2) combined in each workflow WF are displayed in the display portion 11a. Therefore, in the present embodiment, "displaying of the workflows WF" means displaying the identification information of each workflow WF as well as the order of processes based on each workflow WF. However, the identification information of each workflow WF may not be displayed, and only the order of processes may be displayed.

As an example of the displaying of the workflows WF of the present embodiment, the example of FIG. 2 shows that processes A, B, C, and D based on the workflow WF1 are combined in this order. Similarly, the example shows that in the workflow WF2, processes A, B, D, and E are combined in this order, and shows that in the workflow WF3, processes A, C, E, and F are combined in this order.

The operation portion 11b is partitioned as an input area for an operation on the image forming apparatus 1, on the screen 11 of the UI portion 5, displays software keys such that the software keys are selectable, and accepts an input by a touch operation of the user. Accordingly, the operation portion 11b is able to accept an operation for performing an execution instruction for a process in the image forming apparatus 1 (hereinafter, sometimes referred to as "execution instruction operation"). FIG. 2 conceptually illustrates a case where execution instruction operations for the processes A, B, and C are sequentially performed.

The user authentication device 7 performs a process of accepting an input of authentication information of the user and causing the user to log in to the image forming apparatus 1 through authentication based on the accepted authentication information. The user authentication device 7 can be realized by an electric circuit incorporated so as to be able to execute the process, an arithmetic processing unit such as a dedicated processor, or a central arithmetic processing unit such as a CPU.

The input of the authentication information of the user can be achieved, for example, by reading of user information from an IC card or inputting of the user information on the UI portion 5. The user authentication device 7 of the present embodiment is configured to read user information from an IC card. The user information to be read includes, in addition to the authentication information of the user, information indicating an attribute such as a department within the organization to which the user belongs.

While the user performs an execution instruction operation for a specific process on the image forming apparatus 1, when the workflow control device 9 detects clumsiness in the operation of the user, the workflow control device 9 displays, in the display portion 11a on the screen 11 of the UI portion 5, an order of processes based on each workflow WF through which execution instructions for processes corresponding to operations already performed by the user can be performed.

The workflow control device 9 of the present embodiment is incorporated into the image forming apparatus 1, but can be provided so as to be separated from the image forming apparatus 1. In the case where the workflow control device 9 is separated from the image forming apparatus 1, the workflow control device 9 may be provided as a server device or the like and connected to the image forming apparatus 1 via a network.

The workflow control device 9 includes a storage portion 13 and a control portion 15.

The storage portion 13 includes a non-transitory storage unit and a data processing circuit which performs a process of inputting and outputting various data and programs to and from the storage unit. The storage portion 13 includes storage units such as a read only memory (ROM) which stores a workflow control program for achieving functions of the workflow control device 9 and data required for processes, a random access memory (RAM) as a working area, and a hard disk drive (HDD) as an auxiliary storage unit.

The control portion 15 is an arithmetic processing unit as a computer which executes the workflow control program to achieve the functions of the workflow control device 9. The control portion 15 of the present embodiment functions as a workflow management portion 17, a clumsiness detection portion 19, a usage frequency management portion 21, a document analysis portion 23, a user information acquisition portion 25, a display processing portion 27, a selection acceptance portion 29, and an execution instruction portion 31 by executing the workflow control program. A process in each of the workflow management portion 17, the clumsiness detection portion 19, the usage frequency management portion 21, the document analysis portion 23, the user information acquisition portion 25, the display processing portion 27, the selection acceptance portion 29, and the execution instruction portion 31 may be achieved by an electric circuit incorporated so as to be able to execute the process in each portion.

The workflow management portion 17 realizes a workflow management function and performs a process of managing the workflows WF. In the management of the workflows WF, storing, update, and the like of the workflows WF are also performed. For example, the workflow management portion 17 accepts storing or changing of the workflow WF based on an input on the UI portion 5, and beforehand stores the accepted workflow WF into the storage unit within the storage portion 13 or updates the accepted workflow WF.

The clumsiness detection portion 19 realizes a clumsiness detection function and performs a process of detecting clumsiness in an execution instruction operation which is performed by the user on the image forming apparatus 1 and delayed from a threshold. That is, while the user performs an execution instruction operation for a specific process on the image forming apparatus 1, the clumsiness detection portion 19 detects whether the operation of the user is a "clumsy operation" delayed from a specific threshold. Specifically, when the user performs a specific key operation on the UI portion 5 a specific number of times or more, or when a specific time period elapses without any execution instruction operation performed by the user on the UI portion 5, this is detected as clumsiness in an operation delayed from the threshold.

The specific key operation is an operation on each software key in the operation portion 11b of the UI portion 5, a hardware key additionally provided to the UI portion 5, or the like. Examples of types of key operations include an operation of cancelling an operation itself which is performed immediately before and an operation of returning to a state previous to an operation performed immediately before. The number of times of the key operation based on which clumsiness is determined can be set to any number based on the type of the key operation, and may be, for example, one or more times in the case of a cancellation operation or a return operation. The elapse of the specific time period based on which clumsiness is determined is an elapse of the specific time period from an operation performed immediately before. The specific time period also may be set to any time period.

The criterion for clumsiness to be detected is not limited to the number of times of the cancellation operation and the elapse of the specific time period, and may be, for example, a plurality of execution instructions for a process which are performed through an execution instruction operation on the UI portion 5. In this case, when the number of times of the execution instructions for the process which are performed through the execution instruction operation on the UI portion 5 exceeds a threshold, the clumsiness detection portion 19 may determine that the execution instruction operation of the user who does not know presence of the workflows WF is delayed from a threshold, and may detect clumsiness in the operation.

The usage frequency management portion 21 realizes a usage frequency management function and performs a process of managing the usage frequency of each workflow WF managed by the workflow management portion 17. The usage frequency management portion 21 of the present embodiment increases a usage count each time the workflow WF is used, and stores the usage count into the storage portion 13. The usage frequency can be obtained as the usage count itself obtained by the increase, a usage count within a specific time period, or the like.

The document analysis portion 23 realizes a document analysis function and performs a process of acquiring document information inputted to the image forming apparatus 1 and analyzing the document information by a character recognition technique or the like. In the present embodiment, the document analysis portion 23 recognizes a document content, a bar code appended to a document, or the like by analyzing scanned image data generated by the scanner device 3.

The user information acquisition portion 25 realizes a user information acquisition function and performs a process of acquiring user information inputted to the image forming apparatus 1. The user information acquisition portion 25 of the present embodiment acquires user information read from an IC card by the user authentication device 7.

The display processing portion 27 realizes a display function and performs a process of displaying an order of processes based on each workflow WF through which execution instructions for processes corresponding to execution instruction operations already performed by the user can be performed in order, in the display portion 11a on the screen 11 of the UI portion 5 based on detection of clumsiness by the clumsiness detection portion 19.

In displaying the workflows WF, the display processing portion 27 acquires, from the storage portion 13, for example, an image obtained by combining identification information of each workflow WF and an order of processes based on the workflow WF, transfers the acquired image to the display portion 11a of the UI portion 5, and causes the display portion 11a to perform a display as described with reference to FIG. 2.

First, with, as a key, execution instruction operations already performed by the user or processes corresponding to the execution instruction operations, the display processing portion 27 searches the storage portion 13 for any workflow WF through which the execution instructions for the processes corresponding to the execution instruction operations can be performed in order. The display processing portion 27 causes the found workflows WF to be displayed in the display portion 11a. In the present embodiment, the display processing portion 27 further narrows down the found workflows WF.

Specifically, the display processing portion 27 narrows down the workflows WF to be displayed on the display portion 11a, based on the usage frequency managed by the usage frequency management portion 21. More specifically, the display processing portion 27 extracts the workflows WF having high usage frequency from among the workflows WF through which the execution instructions for the processes corresponding to the execution instruction operations already performed by the user can be performed in order.

In addition, the display processing portion 27 narrows down the workflows WF to be displayed, based on a result of analysis of document information by the document analysis portion 23. Specifically, based on information of a document content or a bar code recognized from scanned image data as the result of analysis of the document information, the display processing portion 27 extracts the workflows WF to be displayed, from among the workflows WF through which the execution instructions for the processes corresponding to the execution instruction operations already performed by the user can be performed in order.

Furthermore, the display processing portion 27 narrows down the workflows WF to be displayed, based on user information acquired by the user information acquisition portion 25. Specifically, based on an attribute in the user information such as the department within the organization to which the user belongs, the display processing portion 27 extracts the workflows WF to be displayed, from among the workflows WF through which the execution instructions for the processes corresponding to the execution instruction operations already performed by the user can be performed in order.

The selection acceptance portion 29 realizes a selection acceptance function and performs a process of accepting a selection of the workflow WF displayed in the display portion 11a on the screen 11 of the UI portion 5.

The execution instruction portion 31 realizes an execution instruction function and performs a process of outputting an instruction for performing a process subsequent to the processes corresponding to the execution instruction operations already performed by the user, to each portion of the image forming apparatus 1 based on the selected workflow WF.

[Workflow Control Process]

Figure 3:
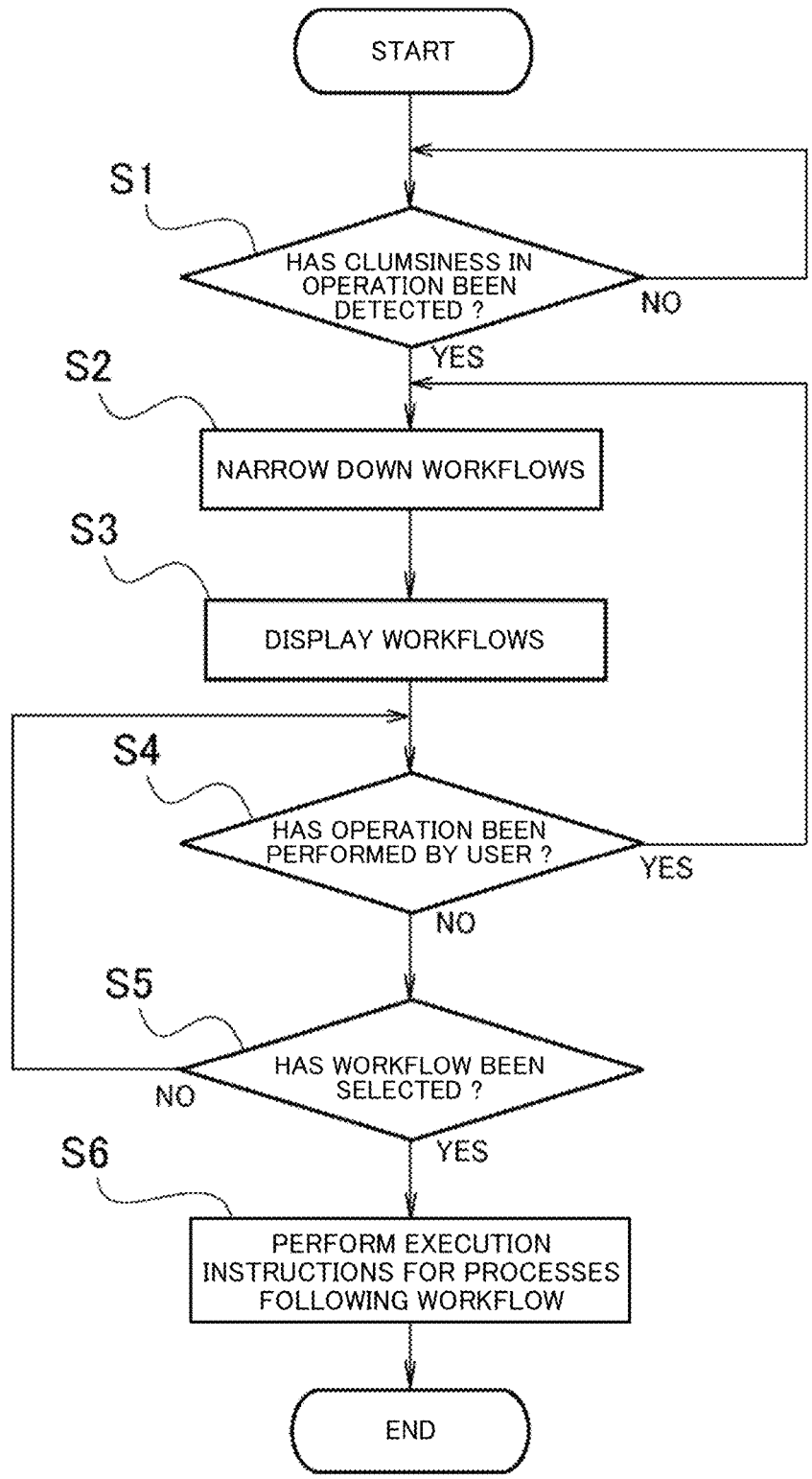
FIG. 3 shows steps of a workflow control process by the workflow control device in FIG. 1.

A flowchart of FIG. 3 shows steps of the workflow control process by the workflow control device in FIG. 1.

The workflow control process of the present embodiment is started when the user performs an execution instruction operation for performing an execution instruction for a process on the image forming apparatus 1. The execution instruction operation is performed, for example, when the user performs a touch operation on a software key in the operation portion 11b on the screen 11 of the UI portion 5 as shown in FIG. 2. At that time, the workflow management portion 17 stores operation information into the storage portion 13. Accordingly, the operation information within the storage portion 13 is updated each time an execution instruction operation is performed. When data (e.g., scanned image data) is generated by a process performed with the execution instruction operation, the workflow management portion 17 also stores the generated data into the storage portion 13. The operation information includes an execution instruction operation already performed by the user, a process corresponding to the execution instruction operation, and information with which data generated through the execution instruction operation is identified.

In step S1, a process of determining "whether clumsiness in an operation has been detected" is performed. That is, the clumsiness detection portion 19 of the workflow control device 9 determines whether an execution instruction operation performed by the user is delayed from a threshold. In the present embodiment, the clumsiness detection portion 19 determines whether the user has performed a cancellation operation or a return operation, which is a specific key operation on the UI portion 5, a specific number of times or more, or whether a specific time period has elapsed without any execution instruction operation performed by the user on the UI portion 5.

If the cancellation operation or the return operation has been performed the specific number of times or more, or if the specific time period has elapsed without any execution instruction operation, it is determined that there is clumsiness in the operation, and the process shifts to step S2 (YES). If there is no such clumsiness in the operation, the process in step S1 is repeated (NO).

In step S2, "narrowing-down of workflows" is performed. That is, the display processing portion 27 of the workflow control device 9 predicts the workflows WF that may be used by the user who is performing the execution instruction operation on the image forming apparatus 1, and narrows down candidates.

In narrowing down candidates, first, with, as a key, execution instruction operations already performed by the user or processes corresponding to to the execution instruction operations, the display processing portion 27 searches the storage portion 13 for any workflow WF through which execution instructions for the processes corresponding to the execution instruction operations can be performed in order. Next, the display processing portion 27 narrows down to the workflows WF having high usage frequency, from among the found workflows WF.

If the processes corresponding to the execution instruction operations already performed include scanning, the display processing portion 27 narrows down to the workflows WF related to information of a document content or a bar code recognized from scanned image data. Furthermore, when the user has logged in to the image forming apparatus 1, the display processing portion 27 narrows down to the workflows WF related to an attribute included in user information acquired when the user logs in, such as the department within the organization to which the user belongs.

The above ways of narrowing-down of the workflows WF can be performed in combination as appropriate or can be performed solely. When the above ways of narrowing-down are performed in combination, it is possible to accurately predict the workflows WF that may be used by the user, and narrow down candidates.

In the example of FIG. 2, if the execution instruction operation already performed by the user is an execution instruction operation for the process A, the workflows WF1 to WF3 through which an execution instruction for the process A can be performed are narrowed down as candidates.

When the narrowing-down of the candidates for the workflows WF is completed, the process shifts to step S3.

In step S3, "displaying of workflows" is performed. That is, the display processing portion 27 of the workflow control device 9 causes identification information of each workflow WF narrowed down as a candidate in step S2 as well as an order of processes thereof to be displayed in the display portion 11a of the UI portion 5 so as to be selectable.

Therefore, the user can recognize the order of processes based on each displayed workflow WF, and can perform an execution instruction operation through the operation portion 11b of the UI portion 5 while referring to the order of processes, or can select and use the displayed workflow WF.

When the displaying of the workflows WF is completed as described above, the process shifts to step S4.

In step S4, a process of determining "whether an operation has been performed by the user" is performed. That is, after the displaying of the workflows WF, the display processing portion 27 of the workflow control device 9 determines whether an execution instruction operation for a process on the image forming apparatus 1 has been performed by the user through the operation portion 11b of the UI portion 5. For example, in the example of FIG. 2, the display processing portion 27 determines whether an execution instruction operation for the process B has been newly performed through the operation portion 11b in a state where the execution instruction operation for the process A has already been performed and the workflows WF1 to WF3 are displayed in the display portion 11a.

If an execution instruction operation has been performed by the user, operation information is stored into the storage portion 13, and the process returns to step S2 (YES). If an execution instruction operation has not been performed by the user, the process shifts to step S5 (NO).

In step S2 to which the process has returned from step S4, the workflow WF that does not include the newly performed execution instruction operation is excluded from the candidates. In the following step S3, the excluded workflow WF is displayed in the display portion 11a so as to be non-selectable. The workflow WF excluded from the candidates may not be displayed in the display portion 11a.

In the example of FIG. 2, if an execution instruction operation for the process C has been newly performed in a state where the execution instruction operations for the processes A and B have already been performed, the workflow WF2, which does not include the process C, and the workflow WF3 become non-selectable.

As described above, the workflows based on continuation of execution instruction operations by the user. If all the currently displayed workflows WF do not include a process for which an execution instruction operation is newly performed, an error display may be performed in the display portion 11a of the UI portion 5.

In step S5, a process of determining "whether a workflow has been selected" is performed. That is, the selection acceptance portion 29 of the workflow control device 9 determines whether the workflow WF currently displayed in the display portion 11a has been selected.

If the currently displayed workflow WF has been selected, the usage count of the workflow WF is increased, and the process shifts to step S6 (YES). If no currently displayed workflow WF has been selected, the process returns to step S4 (NO).

In step S6, "execution instructions for processes following the workflow" are performed. That is, the execution instruction portion 31 of the workflow control device 9 executes the workflow WF as a program within the storage portion 13 based on the identification information of the selected workflow WF.

Accordingly, the execution instructions for the processes subsequent to the processes corresponding to the execution instruction operations already performed by the user can be performed with respect to each portion of the image forming apparatus 1 based on the executed workflow WF while referring to the operation information within the storage portion 13. For example, in the example of FIG. 2, the workflow WF1 is selected in a state where the execution instruction operations for the processes A, B, and C have already been performed, and an execution instruction for the remaining process D is performed.

When step S6 is completed as described above, the workflow control process ends.

Advantageous Effects of Embodiment

The workflow control device 9 of the present embodiment includes: the workflow management portion 17 which manages each workflow WF for combining processes corresponding to specific operations on the image forming apparatus 1, in a specific order, and performing execution instructions for the processes; the clumsiness detection portion 19 which detects clumsiness in an execution instruction operation which has been performed by the user on the image forming apparatus 1 and delayed from the threshold; and the display processing portion 27 which causes an order of processes based on each workflow WF through which execution instructions for processes corresponding to execution instruction operations already performed by the user can be performed in order, to be displayed in the display portion 11a on the screen 11 based on detection of the clumsiness.

Therefore, in the present embodiment, if there is clumsiness in an operation performed by the user on the image forming apparatus 1, an order of processes based on each workflow WF through which execution instructions for processes corresponding to execution instruction operations already performed on the image forming apparatus 1 can be performed in order can be displayed in the display portion 11a on the screen 11, thereby allowing the user to recognize the order of processes.

Therefore, although there is a high possibility that the user who has performed a clumsy operation does not recognize the workflows WF beforehand, even the user who does not recognize such workflows WF beforehand can perform a corresponding specific execution instruction operation while referring to the displayed order of processes based on the workflow WF, or can use the workflow WF recognized from the displayed order of processes. In either case, the user can be allowed to perform, on the image forming apparatus 1, an execution instruction for a process following the workflow WF. As a result, the user who does not recognize presence of workflows is prevented from making a mistake of performing an execution instruction for a process different from those in the workflow WF.

In the present embodiment, the workflows WF can be narrowed down with, as a key, execution instruction operations already performed by the user or processes corresponding to the execution instruction operations. Thus, it is possible to cause the process to be performed at a high speed, and it is possible to present an order of processes based on each workflow WF that is likely to be used by the user, to the user, thereby allowing the user to recognize the order of processes.

If the user has performed a specific key operation the specific number of times or more, or if the specific time period has elapsed without any operation performed by the user, the clumsiness detection portion 19 of the present embodiment detects clumsiness in the operation. Therefore, in the present embodiment, it is possible to assuredly detect user's clumsiness in an operation.

The workflow control device 9 of the present embodiment includes: the selection acceptance portion 29 which accepts a selection of the workflow WF displayed in the display portion 11a on the screen 11, that is, the workflow WF corresponding to the displayed order of processes; and the execution instruction portion 31 which performs an execution instruction for a process subsequent to the processes corresponding to the execution instruction operations already performed by the user, based on the selected workflow WF.

Therefore, in the present embodiment, by only selecting the workflow WF displayed in the display portion 11a, the user can easily use the workflow WF recognized on the basis of the order of processes displayed in the display portion 11a.

The workflow control device 9 of the present embodiment includes the usage frequency management portion 21 which manages the usage frequency of each workflow managed by the workflow management portion 17, and the display processing portion 27 narrows down the workflows WF to be displayed, that is, the workflows WF through which execution instructions for processes corresponding to operations already performed by the user can be performed in order, based on the usage frequency.

Therefore, in the present embodiment, based on statistical data of the workflows WF that are used by other users in past, the workflows WF that may be used by the user can be predicted to narrow down candidates.

In addition, the workflow control device 9 of the present embodiment includes the document analysis portion 23 which acquires and analyzes scanned image data as document information inputted to the image forming apparatus 1, and the display processing portion 27 narrows down the workflows WF to be displayed (the workflows WF through which execution instructions for processes corresponding to operations already performed by the user can be performed in order), based on a result of the analysis of the scanned image data.

Therefore, in the present embodiment, for example, when a document is scanned, the workflows WF that may be used by the user can be predicted to narrow down candidates, based on information of the document possessed by the user.

Furthermore, the workflow control device 9 of the present embodiment includes the user information acquisition portion 25 which acquires user information inputted to the image forming apparatus 1, and the display processing portion 27 narrows down the workflows WF to be displayed (the workflows WF through which execution instructions for processes corresponding to operations already performed by the user can be performed in order), based on the user information.

Therefore, in the present embodiment, based on an attribute or the like of the user in the user information, the workflows WF that may be used by the user can be predicted to narrow down candidates.

The workflow control program of the present embodiment can realize the functions of the workflow control device 9 to exert the same advantageous effects as those of the workflow control device 9.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A workflow control device comprising:
   a processor; and
   a memory storing instructions to be executed by the processor, the instructions including:
   a workflow management processing portion configured to perform a process of storing and managing, in a storage portion, a workflow for combining processes corresponding to specific operations on an electronic apparatus, in a specific order, and performing execution instructions for the processes;
   a clumsiness detection processing portion configured to determine whether or not an input, accepted by a user interface of the electronic apparatus, of an operation which has been performed by a user on the electronic apparatus is delayed from a threshold, and, when it is determined that the input of the operation is delayed from the threshold, perform a process of detecting the input of the operation as the input of a clumsy operation;
   a display processing portion configured to perform, when the clumsiness detection processing portion detects the input of the clumsy operation, a process of extracting, from the storage portion, identification information of a workflow through which execution instructions for a plurality of processes corresponding to the input of operations on the electronic apparatus can be performed in order, and causing the workflow and an order of the plurality of processes combined in the workflow to be displayed on a screen;
   a selection acceptance processing portion that performs a process of accepting a selection of the workflow corresponding to the order of processes displayed on the screen;
   an execution instruction processing portion that performs an execution instruction for a process subsequent to the processes corresponding to the input of the operations, based on the selected workflow; and
   a usage frequency management processing portion that performs a process of managing a usage frequency of the workflow managed by the workflow management processing portion, wherein
   the display processing portion
     searches workflows managed by the workflow management processing portion for workflows through which execution instructions for the plurality of processes corresponding to the input of operations on the electronic apparatus can be performed in order, using the input accepted by the user interface of the electronic apparatus of the operation which has been performed by the user on the electronic apparatus as a key,
     narrows down workflows retrieved as a result of search to workflows having high usage frequency, and
     displays, on the screen, orders of processes of the narrowed-down workflows together with identification information of the narrowed-down workflows.

2. The workflow control device according to claim 1, wherein if the input of an operation based on a specific key operation which has been performed by the user is accepted a specific number of times or more, or if a specific time period has elapsed from when the input of an operation is accepted until when a following input of an operation is accepted, the clumsiness detection processing portion detects the input of the operation as the input of the clumsy operation.

3. The workflow control device according to claim 1, further comprising a document analysis processing portion that performs a process of acquiring and analyzing document information inputted to the electronic apparatus, wherein
   the display processing portion narrows down the narrowed-down workflows to workflows that include the processes corresponding to the input of the operations in order, based on a result of analysis of the document information, and causes an order of processes based on each of the narrowed-down workflows to be displayed on the screen together with identification information of the narrowed-down workflows.

4. The workflow control device according to claim 1, further comprising a user information acquisition processing portion that performs a process of acquiring user information of the user inputted to the electronic apparatus, wherein the display processing portion narrows down the narrowed-down workflows to workflows that include the processes corresponding to the input of the operations in order, based on the user information, and causes an order of processes based on each of the narrowed-down workflows to be displayed on the screen together with identification information of the narrowed-down workflows.

5. A non-transitory computer-readable storage medium having stored therein a workflow control program executable by a computer, the workflow control program causing the computer to realize:
- a workflow management function of performing a process of storing and managing, in a storage portion, a workflow for combining processes corresponding to specific operations on an electronic apparatus, in a specific order and performing execution instructions for the processes;
- a clumsiness detection function of determining whether or not an input, accepted by the electronic apparatus, of an operation which has been performed by a user on the electronic apparatus is delayed from a threshold, and, when it is determined that the input of the operation is delayed from the threshold, performing a process of detecting the input of the operation as the input of a clumsy operation;
- a display function of performing, when the input of the clumsy operation is detected, a process of extracting, from the storage portion, identification information of a workflow through which execution instructions for a plurality of processes corresponding to the input of operations on the electronic apparatus can be performed in order, and causing the workflow and an order of the plurality of processes combined in the workflow to be displayed on a screen;
- a selection acceptance processing portion that performs a process of accepting a selection of the workflow corresponding to the order of processes displayed on the screen;
- an execution instruction processing portion that performs an execution instruction for a process subsequent to the processes corresponding to the input of the operations, based on the selected workflow; and
- a usage frequency management processing portion that performs a process of managing a usage frequency of the workflow managed by the workflow management function, wherein
- the display function
  - searches workflows managed by the workflow management function for workflows through which execution instructions for the plurality of processes corresponding to the input of operations on the electronic apparatus can be performed in order, using the input accepted by a user interface of the electronic apparatus of the operation which has been performed by the user on the electronic apparatus as a key,
  - narrows down workflows retrieved as a result of search to workflows having high usage frequency, and
  - displays, on the screen, orders of processes of the narrowed-down workflows together with identification information of the narrowed-down workflows.

* * * * *